March 20, 1945. G. STEEB 2,372,134
PROTECTIVE RELAY SYSTEM
Filed June 24, 1942

Relay Pick-up Amperes.

WITNESSES:

INVENTOR
George Steeb.
BY
ATTORNEY

Patented Mar. 20, 1945

2,372,134

UNITED STATES PATENT OFFICE 2,372,134

PROTECTIVE RELAY SYSTEM

George Steeb, Buffalo, N. Y., assignor to Westinghouse Electric & Manufacturing Company, East Pittsburgh, Pa., a corporation of Pennsylvania Application June 24, 1942, Serial No. 448,232

8 Claims. (Cl. 175—294)

This invention relates to electrical systems, and it has particular relation to electrical systems having a plurality of circuit interrupters selectively controlled by electrical relays.

Many electrical systems have a plurality of circuit interrupters or breakers which are tripped in a predetermined sequence upon the occurrence of a fault on the system under the control of selectively operated relays. The purpose of this selective control is to disconnect a faulty portion of an electrical system from the remainder of the electrical system without interrupting the flow of electrical energy in the remainder of the electrical system.

Under certain conditions, it is desirable that a relay employed for selectively controlling one of a plurality of circuit interrupters have either of a plurality of characteristics. For example, reference may be made to an electrical system wherein selectivity of relays is obtained by varying the time delay in the operation of the relays inversely with the distances of the electrical relays from the source of power employed for the electrical system. In such a system, a relay adjacent the source of power may require a time delay in operation for fault currents of moderate magnitude which inherently provides an undesirably long time delay for fault currents of large magnitude. This long time delay for fault currents of large magnitude may be sufficient to result in a loss of stability of the electrical system. In such a case, it is desirable to provide a relay having a first time delay relay characteristic for fault currents of moderate magnitude and a second relay characteristic involving shorter time delays for fault currents of large magnitude.

In accordance with the invention, the energization of a relay is modified to provide the desired relay characteristics. As a specific example, reference may be made to an overcurrent relay having two energizing windings coacting when energized to operate the relay. Under normal conditions of energization, the relay has a first time delay characteristic. In order to provide a second time delay characteristic, an auxiliary overcurrent relay is provided for connecting the two windings in parallel for increasing or decreasing the energization of one of the windings. If the connection is such that the energization of the one winding is increased, a second relay characteristic is produced which provides the desired decrease in time delay for heavy fault currents.

If the connection of the windings is such that the energization of the one winding is reduced or reversed, operation of the relay is blocked. Such blocking may be desirable to prevent a tripping operation of an associated circuit interrupter when the associated circuit interrupter carries a current greater than it is designed to interrupt.

It is, therefore, an object of the invention to provide an electrical system having a plurality of circuit interrupters selectively controlled by relays, and having means for modifying the relay characteristic of one of the relays.

It is a further object of the invention to provide an electrical system having a plurality of circuit interrupters selectively controlled by relays, and having means responsive to a variable quantity present in the system for increasing the energization of one of the relays.

It is another object of the invention to provide an electrical system having a plurality of circuit interrupters selectively controlled by relays, and having means responsive to a variable quantity present in the system for modifying the relay characteristic of one of the relays to block operation of the relay.

It is a still further object of the invention to provide an electrical relay having a pair of energizing windings, and having means responsive to a variable quantity for connecting at least part of the windings in parallel.

Other objects of the invention will be apparent from the following description taken in conjunction with the accompanying drawing, in which.

Figure 1:
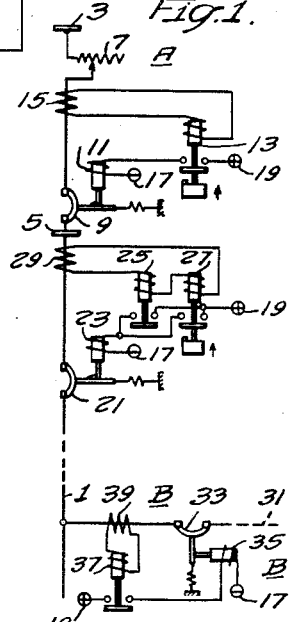
Figure 1 is a schematic view in single line of a typical electrical system.

Referring to the drawing, Fig. 1 shows an electrical system including a main station A and a substation B which are connected by a transmission circuit 1 of substantial length. Although the electrical system may be designed for single phase or polyphase operation, it is assumed for the purpose of the discussion that the system is a three-phase system designed for operation at a frequency of 60 cycles per second.

Electrical energy is supplied to the main station A at any suitable voltage such as 110 kilovolts from any suitable source here represented by a bus 3. This bus energizes a second bus 5 in the main station A through an autotransformer 7 which steps the voltage down from 110 to 60 kilovolts at the bus 5. The connection of the autotransformer to the bus 5 is controlled by a circuit interrupter 9 having a trip coil 11 associated therewith. As well understood in the art, energization of the trip coil 11 operates to trip the circuit interrupter 9.

Energization of the trip coil 11 is effected by means of a suitable relay 13 which may take the form of an induction relay designed to close its contacts with time delay. As illustrated in Fig. 1, the energizing winding of the relay 13 is energized from the secondary winding of a current transformer 15. Although only one relay and one current transformer are illustrated for association with one phase conductor of the three-phase system, it will be understood that three similar relays and three similar current transformers may be associated, respectively, with the three-phase conductors of the system in accordance with standard practice for controlling the tripping of the circuit interrupter 9. Closure of the front contacts of the relay 13 connects the trip coil 11 to a suitable source of electrical energy which may take the form of a direct-current electrical battery represented by conventional negative and positive polarity markings 17 and 19.

The connection of the transmission circuit 1 to the bus 5 is controlled by a circuit interrupter 21 having a trip coil 23 associated therewith. Connection of the trip coil 23 to a source of electrical energy is effected by the closure of front contacts of either an instantaneously operating relay 25 or a time delay relay 27. The time delay relay 27 again may take the form of an induction type relay. The energizing windings of the relays 25 and 27 are connected in series across the secondary winding of a current transformer 29. The primary of the current transformer is connected for energization in accordance with current flowing to the transmission circuit 1 from the bus 5. As previously pointed out a similar relay system may be provided for each phase conductor of the polyphase system.

At the substation B, a circuit 31 is connected to the transmission circuit 1 for energization therefrom. The connection of the circuit 31 to the transmission circuit 1 is controlled by a circuit interrupter 33 having a trip coil 35 associated therewith. The trip coil 35 is connected across a suitable source of electrical energy by closure of the front contacts of an overcurrent relay 37. This overcurrent relay is energized in accordance with current flowing to the circuit 31 by means of a current transformer 39 associated with the circuit 31.

As representative of the fault currents flowing as a result of a severe three-phase fault, it will be assumed that such a fault adjacent the substation B results in the flow of current of approximately 1,500 amperes. It is assumed further that a similar fault adjacent the bus 5 results in the flow of a fault current of approximately 2520 amperes. The instantaneous relay 25 is designed to pick up and close its contacts when energized by a current in excess of 1,800 amperes flowing in the primary of the current transformer 29. This relay closes its contacts in about 1 cycle, and may be relied on to trip the circuit interrupter 21 in response to three-phase faults occurring along most of the transmission circuit 1.

For fault currents smaller in magnitude than 1,800 amperes, it is desirable that selectivity be maintained between the relay 37 at the substation B and the relay 27 at the main station A. For this reason, it is desirable that the relay 27 have a time delay of the order of 40 cycles when energized by a current of approximately 1,800 amperes flowing through the primary of the current transformer 29.

To provide proper selectivity between the relays 27 and 13, the relay 13 then should have a time delay of the order of 66 cycles when energized by a current of 1,800 amperes flowing through the primary of the transformer 15.

Figure 2:
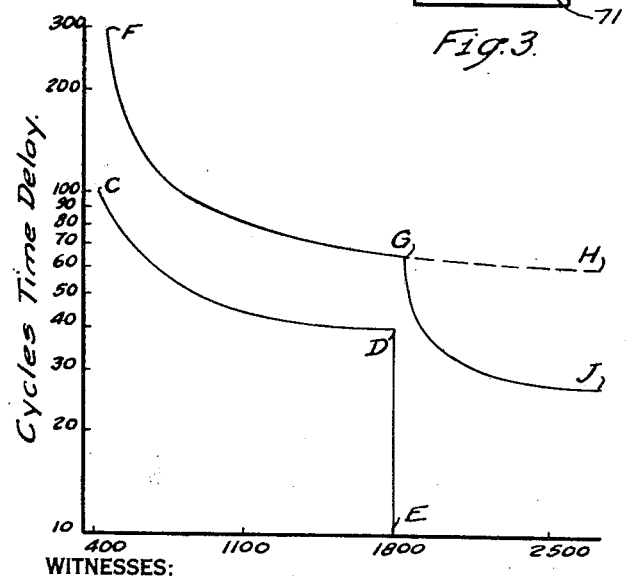
Fig. 2 is a graphical representation of the characteristics of electrical relays.

If the relay 13 is of a standard induction type, the provision of the required time delay may result in an excessive time delay for heavy fault currents. This may be shown more clearly by reference to Fig. 2 wherein relay characteristics are graphically represented. In Fig. 2 ordinates represent cycles of the alternating voltage applied to the system which are required for relay operation, whereas abscissae represent the currents in amperes at which the relay is to pick up. The current values herein specified are the primary currents flowing in the associated current transformers.

The characteristic of the combined relays 25 and 27 is represented in Fig. 2 by a curve C—D—E. The portion C—D of the curve represents the inverse time delay introduced by a conventional induction type overcurrent relay. This time delay has a value of approximately 40 cycles when 1,800 amperes pass through the primary of the current transformer 29. At the point D, the instantaneous relay 25 picks up to close its contacts in approximately 1 cycle.

As previously explained, proper selectivity between the relays 13 and 27 requires a greater time delay in the operation of the relay 13. If the relay 13 is a conventional induction type overcurrent relay, its inverse time characteristic may be represented by a curve F—G—H. The portion G—H of the curve is shown in dotted lines. For an abscissa of 1,800 amperes, the curve F—G—H indicates a time delay of approximately 66 cycles. This assures proper selectivity between the relays 13 and 27.

Should a fault occur on the bus 5, a fault current of 2,520 amperes may flow thereto. From the characteristic curve F—G—H, it is found that such a current represents a time delay of about 62 cycles in the closure of the overcurrent relay 13. Assuming that the associated circuit interrupter requires 16 cycles for an opening operation, the entire delay in interrupting the fault current amounts to about 78 cycles. In a conventional system, this excessive time delay for a heavy fault current probably would result in the loss of stability of the 110 kilovolt system connected to the bus 3. For this reason, it is desirable that the time delay for the relay 13 be decreased. This decrease must not result in a loss of selectivity between the relays 13 and 27.

The desired operation of the relay 13 may be obtained by providing the relay with a characteristic represented in Fig. 2 by the curve F—G—J. By inspection of this figure, it will be observed that the portion F—G is unchanged to a point representing a current somewhat greater than 1,800 amperes. At this point, the time delay of the relay rapidly drops to values substantially lower than those represented by the portion G—H of the conventional curve.

The modified curve F—G—J for a current of 2,520 amperes provides a time delay in relay closure of approximately 30 cycles. Adding to this, the 16 cycles required for opening of the associated circuit interrupter, the overall time required for interruption of a fault current of 2,520 amperes is approximately 46 cycles. Such a time delay does not result in a loss of stability of the 110 kilovolt system connected to the bus 3. A relay system providing the desired characteristic curve F—G—J is illustrated in Fig. 3.

Figure 3:
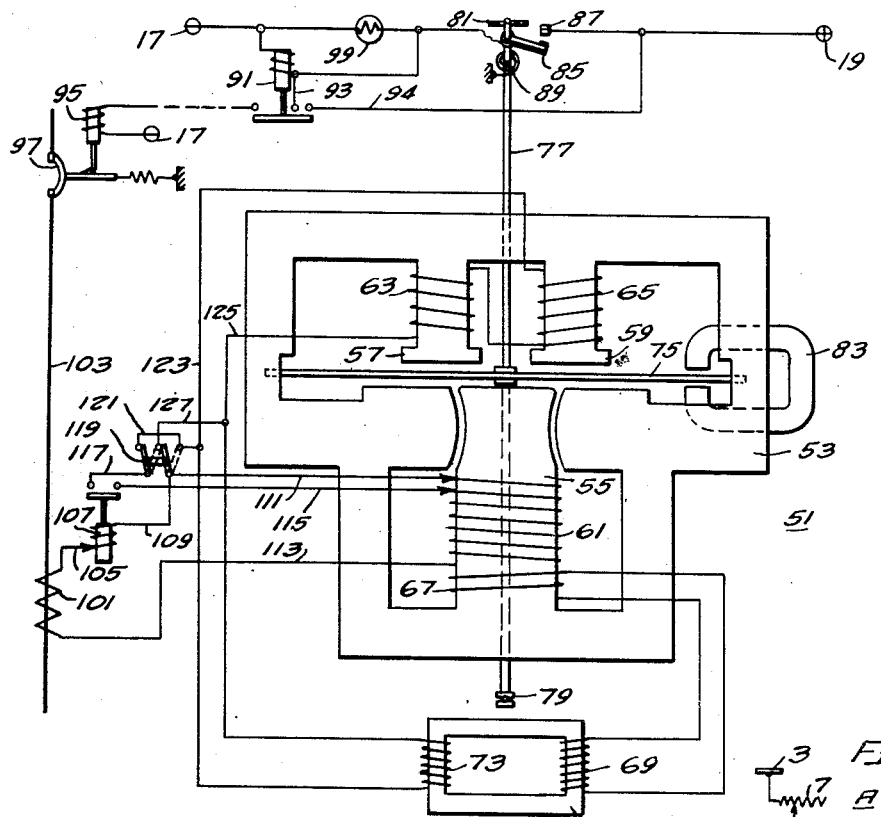
Fig. 3 is a schematic view with parts in elevation of an electrical relay system embodying the invention.

Referring to Fig. 3, a relay system is disclosed which includes an induction type overcurrent relay 51 having a magnetic core 53. This magnetic core includes a main pole 55 and auxiliary poles 57 and 59 which are spaced to define an air gap. A first energizing winding 61, which may be termed a main winding, surrounds the main pole 55. Second energizing windings 63 and 65, which may be termed auxiliary windings surround the poles 57 and 59.

The auxiliary windings 63 and 65 are energized from a winding 67 which also surrounds the main pole 55. By inspection of Fig. 3, it will be observed that the windings 61 and 67 constitute, respectively, the primary and secondary windings of a transformer. Consequently, energization of the winding 61 operates to induce a voltage in the winding 67. The winding 67 is connected to the primary winding 69 of a saturable transformer or torque compensator 71. The secondary winding 73 of the torque compensator 71 is connected across the auxiliary windings 63 and 65 for energizing the latter. As well understood in the art, saturation of the torque compensator provides a definite minimum time delay for the relay.

Energization of the windings 61, 63 and 65 produces a shifting magnetic field in the air gap between the poles. An electroconductive armature in the form of a disk 75 is positioned in this air gap for rotation by the shifting magnetic field. The disk 75 may be mounted on a shaft 77 which, in turn, is rotatably mounted in bearings 79 and 81. Rotation of the disk is damped by means of a permanent magnet 83 having pole faces positioned to direct magnetic flux through the disk 75.

The shaft 77 carries a contact 85 which is rotatable with the shaft 77 into and out of engagement with a fixed contact 87. A spiral spring 89 biases the roatable contact 85 out of engagement with the fixed contact 87.

When the contact 85 engages the fixed contact 87, the energizing winding of a contactor 91 is connected to a suitable source of energy represented by the polarity markings 17 and 19. As a result of its energization, the contactor 91 picks up to close its front contacts. Such closure operates through conductors 93 and 94 to establish a holding circuit for the contactor 91. Closure of the contacts of the contactor 91 also connects a trip coil 95 to the source of energy represented by the polarity markings 17 and 19. This trip coil 95 may be employed for tripping a circuit interrupter 97 which may correspond to the circuit interrupter 9 of Fig. 1. An operation indicator 99 is connected in parallel with the energizing winding of the contactor 91 to indicate the operation of the relay 51.

The portion of the relay 51 thus far specifically described corresponds to a standard induction type relay. Relays of this type are disclosed in the Smith et al. Patent 1,286,239 and are fully described in the Relay Handbook, published by the National Electric Light Association, New York city, 1926, pages 104 to 118.

Energization of the winding 61 of the relay 51 may be derived from the secondary winding of a current transformer 101 which has its primary winding connected in a circuit 103. The conductor 103 may represent one phase conductor of the system of Fig. 1, and the current transformer 101 then corresponds to the current transformer 15 of Fig. 1. The secondary winding of the current transformer 101 is connected to the main winding 61 through a circuit which may be traced from one terminal of the current transformer through a conductor 105, the energizing winding of an instantaneous overcurrent relay 107, conductors 109 and 111, the main winding 61 and a conductor 113 to a second terminal of the current transformer 101. It will be observed that the conductor 111 is adjustably connected to the main winding 61. By varying the tap of the main winding 61 to which the conductor 111 is connected, the number of effective turns of the main winding 61 and the sensitivity of the relay may be adjusted.

The relay 51 as thus far described would have a characteristic similar to that represented by the curve F—G—H in Fig. 2. In order to modify the characteristic to that represented by the curve F—G—J, the instantaneous overcurrent relay 107 is provided for modifying the energization of the auxiliary windings 63 and 65.

By inspection of Fig. 3, it will be noted that the instantaneous overcurrent relay 107 has its energizing winding connected in series with the main winding 61. The instantaneous relay is designed to pick up and close its front contacts at a predetermined current which for the specific system herein discussed may have a value somewhat larger than 1800 amperes (referred to the primary of the current transformer 101) as represented by the point G in Fig. 2. The current value at which the instantaneous relay 107 picks up to close its contacts may be adusted by varying the point of connection of the conductor 105 to the energizing winding of the instantaneous relay. Such adjustment varies the number of effective turns in the energizing winding.

Closure of the contacts of the instantaneous relay 107 connects the auxiliary windings 63 and 65 and the secondary winding 73 of the torque compensator in parallel with a portion of the main winding 61. Since the secondary winding 73 has a high impedance, the effect of such connection on the secondary winding 73 may be disregarded. The connections for the auxiliary windings 63 and 65 may be traced from the conductor 111 through a portion of the main winding 61, a conductor 115, the contacts of the instantaneous relay 107, a conductor 117, one blade of a reversing switch 119, a conductor 121, a conductor 123, the auxiliary windings 65 and 63, conductors 125 and 127, and the remaining blade of the reversing switch 119 to the conductor 111. Consequently, when the instantaneous relay 107 closes its contacts, a portion of the current flowing through part of the main winding 61 is diverted through the auxiliary windings 63 and 65.

Depending on the position of the reversing switch 119, the current supplied therethrough to the auxiliary windings 63 and 65 is either in proper phase for assisting in urging the movable contact 85 towards the fixed contact 87, or it is 180° displaced in phase to urge the movable contact 85 away from the fixed contact 87.

Let it be assumed that with the reversing switch 119 in the position shown in full lines in Fig. 3, the energization therethrough of the auxiliary windings 63 and 65 is in such direction as to assist in urging the contact 85 towards the fixed contact 87. Under such circumstances, operation of the instantaneous relay 107 materially decreases the time delay of the relay 51 and a characteristic curve is obtained which is represented by the curve F—G—J of Fig. 2. The amount of change in the characteristic of the relay 51 produced by closure of the instantaneous relay 107 may be adjusted by varying the number of turns of the main winding 61 which are included between the conductors 111 and 115. It will be observed that both of these conductors are adjustable with respect to the main winding 61, and that the conductor 115 is connected to the main winding 61 intermediate the points of connection thereto of the conductors 111 and 113.

It is believed that the operation of the invention is apparent from the foregoing description. For moderate fault currents, the contacts of the instantaneous relay 107 are open, and the relay 51 has a time delay similar to that represented by the curve portion F—G of Fig. 2. Over the range represented by the curve portion F—G, the relay 51 operates in a manner similar to the operation of a standard overcurrent induction relay.

When the current flowing through the primary of the current transformer 101 exceeds a predetermined value represented by the point G in Fig. 2, the instantaneous relay 107 closes its contacts to energize the auxiliary windings 63 and 65 in parallel with a portion of the main winding 61. This substantially decreases the time delay of the relay 51, as represented by the curve portion G—J in Fig. 2.

When the relay 13 of Fig. 1 is similar to the relay arrangement of Fig. 3, proper selectivity is obtained between the relays 13 and 17, and fast operation of the relay 13 is obtained for fault currents which are extremely large in magnitude. In such a case, the relay 13 has a characteristic represented by the curve F—G—J of Fig. 2 and the combined relays 25 and 27 have a characteristic similar to that represented by the curve C—D—E of Fig. 2.

A fault on the transmission circuit 1 which produces a current flow between the points C and D of Fig. 2 produces an operation of the relay 27 before the relay 13 can operate. Over this range, the relay 27 has a shorter time delay than that represented by the curve portion F—G for the relay 13.

If a fault on the transmission circuit 1 results in the flow of a current in excess of 1,800 amperes, the instantaneous relay 25 operates in approximately one cycle to clear the fault. By inspection of Fig. 2, it will be observed that the curve portion G—J provides a time delay in operation of the relay 13 sufficient to permit prior operation of the relay 25.

Should the circuit interrupter 21 fail to open for any reason, the relay 13 operates as a backup relay to trip the circuit interrupter 9. Because of the decrease in time delay represented by the curve portion G—J, the circuit interrupter 9 trips for currents above 1,800 amperes flowing in the associated circuit before loss of stability occurs on the system.

Should a fault occur on the bus 5 which results in the flow of an excessive fault current, such as 2,500 amperes, the circuit interrupter 9 is tripped in a time short enough to prevent loss of stability on the system.

As previously pointed out, if the reversing switch 119 occupies the position indicated in dotted lines in Fig. 3, closure of the instantaneous relay 107 blocks operation of the relay 51. Such blocking may be desirable to prevent a tripping operation of an associated circuit interrupter when the circuit interrupter carries a current in excess of its current interrupting capacity. For example, let it be assumed that the circuit interrupter 33 of Fig. 1 has a current interrupting capacity of 1,200 amperes, and that the relay 37 of Fig. 1 is controlled by a relay similar to the relay of Fig. 3 with the reversing switch 119 in its dotted line position. Since the interrupting capacity of the circuit interrupter 33 is assumed to be 1,200 amperes, the instantaneous relay 107 is adjusted to pick up and close its contacts when a current of 1,200 amperes flows through the primary of its associated current transformer. Consequently, if a current in excess of 1,200 amperes flows through the circuit interrupter 33, the instantaneous relay 107 picks up to prevent a tripping operation of the circuit interrupter 33. The circuit interrupter 21, which may be designed to interrupt a current in excess of 1,200 amperes, subsequently trips to remove the fault from the remainder of the system.

Although the invention has been discussed with reference to certain specific embodiments thereof, numerous modifications are possible. Therefore, the invention is to be restricted only by the appended claims as interpreted in view of the prior art.

I claim as my invention:

1. In an electrical system, an overcurrent relay having a first energizing winding designed for energization in accordance with the current to which said relay responds, said relay having a second energizing winding, means normally connecting said second energizing winding for a first energization in accordance with a first function of the energization of said first energizing winding, means responsive to the combined energizations of said first and second energizing winding, and means responsive to predetermined values of a variable quantity for connecting said second energizing winding in parallel with at least a portion of said first energizing winding for energization in accordance with a second function of the energization of said first energizing winding.

2. In an electrical system, a first overcurrent relay having a first energizing winding designed for energization in accordance with the current to which said relay responds, said relay having a second energizing winding, means normally connecting said second energizing winding for a first energization in accordance with a first function of the energization of said first energizing winding, means responsive to the combined energization of said first and second energizing winding, and means responsive to predetermined values of a variable quantity for connecting said second energizing winding in parallel with at least a portion of said first energizing winding for energization in accordance with a second function of the energization of said first energizing winding, said last named means comprising a second overcurrent relay connected for energization in accordance with the energization of said first overcurrent relay, and circuit connections completed by said second overcurrent relay for placing said second energizing winding in parallel with at least a portion of said first energizing winding for a second energization which adds to said first energization of said second energizing winding, whereby operation of said second overcurrent relay increases the rate of response of said first overcurrent relay.

3. In an electrical system, a first overcurrent relay having a first energizing winding, designed for energization in accordance with the current to which said relay responds, said relay having a second energizing winding, means normally connecting said second energizing winding for a first energization in accordance with a first function of the energization of said first energizing winding, means responsive to the combined energizations of said first and second energizing winding, and means responsive to predetermined values of a variable quantity for connecting said second energizing winding in parallel with at least a portion of said first energizing winding for energization in accordance with a second function of the energization of said first energizing winding, said last named means comprising a second overcurrent relay connected for energization in accordance with the energization of said first overcurrent relay, and circuit connections completed by said second overcurrent relay for placing said second energizing winding in parallel with at least a portion of said first energizing winding for a second energization which is opposed to said first energization of said second energizing winding, whereby operation of said second overcurrent relay tends to block operation of said first overcurrent relay.

4. In an electrical system, a first relay responsive to a predetermined variable quantity, means for energizing said first relay in accordance with said variable quantity for operation at any value of said quantity within a predetermined substantial range of values, a second relay responsive to said predetermined variable quantity for operation at a value of said quantity falling within part only of said range of values, and means responsive to operation of said second relay for energizing said first relay in opposition to the energization of said first relay by said first energizing means, whereby operation of said second relay tends to block operation of said first relay.

5. In an electrical system, an overcurrent induction relay comprising a first winding and a second winding effective when energized for producing a shifting magnetic field in an air gap, an electroconductive armature element mounted for rotation in said air gap by said shifting magnetic field, means for energizing said first winding in accordance with a variable current to which said induction relay is to respond, means for energizing said second winding through a saturating transformer to produce a first predetermined relay characteristic, and means for connecting said second winding in parallel with at least a portion of said first winding for modifying the relay characteristic of said induction relay.

6. In an electrical system, an overcurrent induction relay comprising a first winding and a second winding effective when energized for producing a shifting magnetic field in an air gap, an electroconductive armature element mounted for rotation in said air gap by said shifting magnetic field, means for energizing said first winding in accordance with a variable current to which said induction relay is to respond, means for energizing said second winding through a saturating transformer to product a first predetermined relay characteristic, and current responsive means for connecting said second winding in parallel with at least a portion of said first winding for additionally energizing said second winding to modify the relay characteristic of said induction relay, said energizations of said second winding being cumulative to increase the rate of response of said induction relay.

7. In an electrical system, an overcurrent induction relay comprising a first winding and a second winding effective when energized for producing a shifting magnetic field in an air gap, an electroconductive armature element mounted for rotation in said air gap by said shifting magnetic field, means for energizing said first winding in accordance with a variable current to which said induction relay is to respond, means for energizing said second winding through a saturating transformer to produce a first predetermined relay characteristic, and current responsive means for connecting said second winding in parallel with at least a portion of said first winding for additionally energizing said second winding to modify the relay characteristic of said induction relay, said energizations of said second winding being opposed, whereby operation of said current responsive means tends to block operation of said induction relay.

8. In an electrical system, a circuit interrupter, and means for tripping said circuit interrupter, said means comprising an electrical relay effective in response to a current flowing through said circuit interrupter over a substantial range of values of said current for initiating a tripping operation of circuit interrupter, said electrical relay including a pair of windings effective when subjected to predetermined energizations for actuating said relay in a tripping operation, and means responsive to a value of said current above that which said circuit interrupter is designed to interrupt for applying a second energization to one of said windings in opposition to said predetermined energization thereof for blocking a tripping operation of said electrical relay.

GEORGE STEEB.